{12} United States Patent  (10) Patent No.: US 8,084,903 B2
Goetze et al. (45) Date of Patent: Dec. 27, 2011

(54) CONNECTION ARRANGEMENT FOR SUPPLYING POWER TO AN ELECTRIC MOTOR

(75) Inventors: Andrea Goetze, Horn-Bad Meinberg (DE); Jens Oesterhaus, Detmold (DE); Stefan Aporius, Lage (DE); Thorsten Beck, Bad Arolsen-Wetterburg (DE); Wolfgang Schild, Herford (DE)

(73) Assignee: Woidmueller Interface GmbH & Co. KG, Dotmold (DE)

( * ) Notice: Subject to any disclaimer, the term of this patent is extended or adjusted under 35 U.S.C. 154(b) by 302 days.

(21) Appl. No.: 12/381,390

(22) Filed: Mar. 10, 2009

(65) Prior Publication Data

US 2009/0230792 A1    Sep. 17, 2009

(30) Foreign Application Priority Data

Mar. 13, 2008    (DE) .................... 20 2008 003 624 U

(51) Int. Cl.
*H02K 11/00* (2006.01)
*H02K 5/00* (2006.01)
(52) U.S. Cl. ............................ 310/71; 310/68 D; 310/89
(58) Field of Classification Search ................ 310/68 D, 310/71, 89; 439/165–177; 318/770–771
See application file for complete search history.

(56) References Cited

U.S. PATENT DOCUMENTS

| 4,880,391 | A | | 11/1989 | Hurtgen |
| 5,885,102 | A | * | 3/1999 | Harting et al. ................ 439/527 |
| 2002/0195286 | A1 | * | 12/2002 | Shirakawa et al. .......... 180/65.1 |

FOREIGN PATENT DOCUMENTS

| DE | 68912009 T2 | 1/1990 |
| DE | 3934981 A1 | 3/1991 |
| DE | 29880014 U1 | 8/1998 |
| DE | 19957064 A1 | 6/2001 |
| DE | 20121081 U1 | 5/2002 |
| DE | 20301077 U1 | 5/2003 |
| DE | 10343990 A1 | 4/2005 |
| DE | 102005042599 A1 | 4/2007 |
| EP | 1104079 A2 * | 5/2001 |
| SU | 1359857 A * | 12/1987 |

OTHER PUBLICATIONS

Machine Translation EP1104079 (2001).*

* cited by examiner

*Primary Examiner* — Quyen Leung
*Assistant Examiner* — Jose Gonzalez Quinones
(74) *Attorney, Agent, or Firm* — Lawrence E. Laubscher, Sr.; Lawrence E. Laubscher, Jr.

(57) ABSTRACT

A connector arrangement is provided for supplying electric power to a three-phase motor to produce motor operation in either a delta mode or a star mode, use being made of modular units that are removably mounted within a chamber contained in an outer frame that is secured to the motor housing. A power supply module arranged within the chamber includes a main receptacle containing a stack of terminal blocks having bus bars that transmit to the motor windings three-phase power that is supplied either by external power supply lines that extend into the chamber though openings contained in the side walls of the outer frame, or from an inverter arranged externally of the outer frame. Auxiliary receptacles are removably connected with the external surface of the main receptacle for monitoring the operating condition of the motor, or for controlling a motor operation, such as braking.

15 Claims, 7 Drawing Sheets

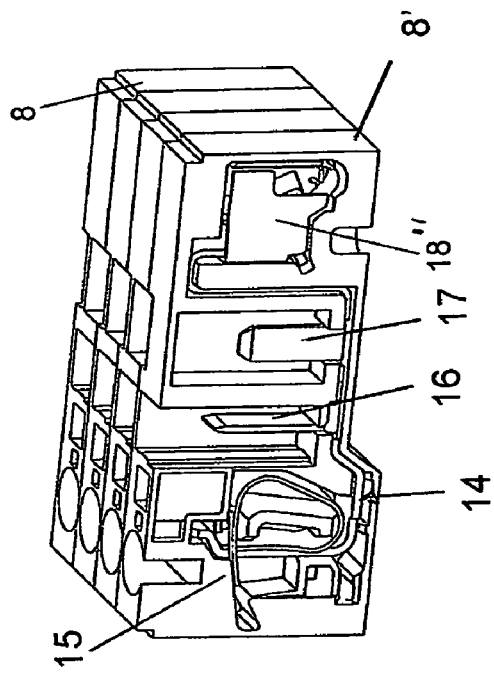
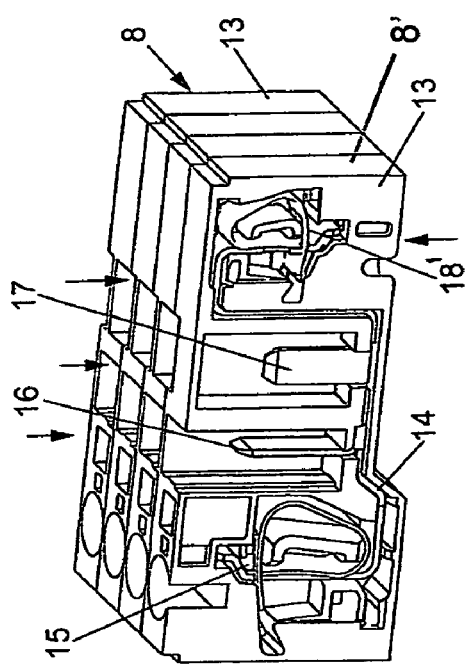
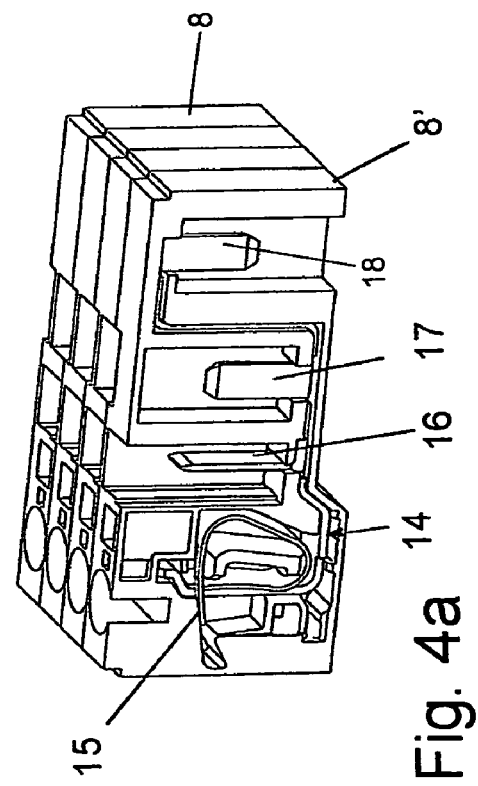
Fig. 4c
Fig. 4b
Fig. 4a

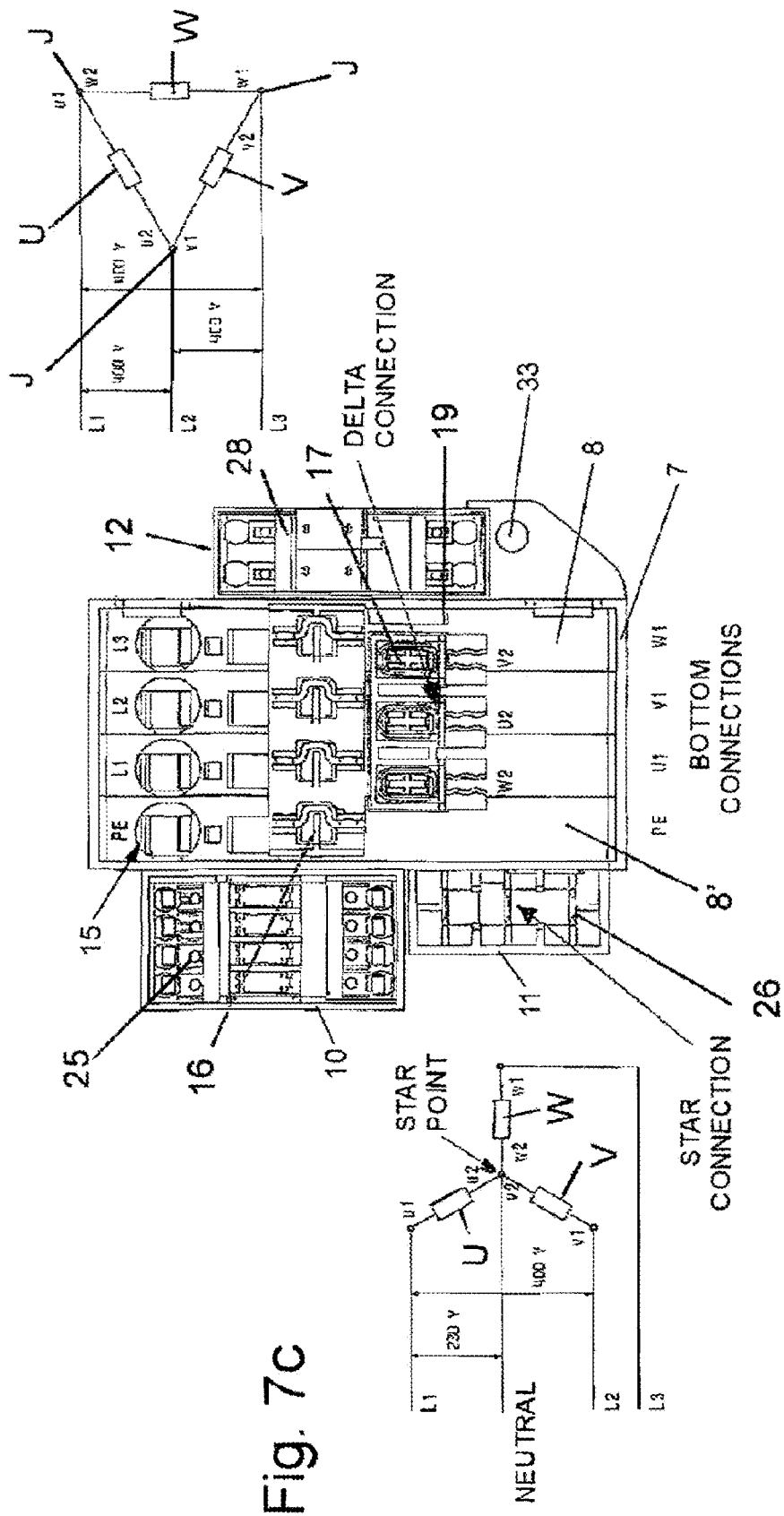

CONNECTION ARRANGEMENT FOR SUPPLYING POWER TO AN ELECTRIC MOTOR

BACKGROUND OF THE INVENTION

1. Field of the Invention

A connector arrangement is provided for supplying electric power to a three-phase motor to produce motor operation in either a delta mode or a star mode, use being made of modular units that are removably mounted within a chamber contained in an outer frame that is secured to the motor housing. A power supply module arranged within the chamber includes a main receptacle containing a stack of terminal blocks having bus bars that transmit to the motor windings three-phase power that is supplied either by external power supply lines that extend into the chamber though openings contained in the side walls of the outer frame, or from an inverter arranged externally of the outer frame. Auxiliary receptacles are removably connected with the external surface of the main receptacle for monitoring the operating condition of the motor, or for controlling a motor operation, such as braking.

2. Description of Related Art

Various motor control arrangement have been proposed in the prior art for operating three-phase electric motors in various operating modes, such as in the delta mode or the star mode. Such connection devices are known per se but they usually conform to the standards of only one specific connection circuit, so it is necessary to provide various connection devices for use with various different control circuits. The object of the present invention is to eliminate this problem, use being made of interchangeable modules that may be mounted in the frame that is attached to the motor housing.

The modular design may be mentioned as a special advantage of this embodiment, making it possible, starting from a basic module, to conform to a wide variety of connection situations through optional expansion housings. According to this, a basic power receptacle is provided to receive preferably a stack of terminal blocks aligned together, preferably on one or more outer sides with coupling means for attaching one or more optional auxiliary housings having corresponding coupling means.

The terminal blocks allow an especially simple and variable design easily in the manner of series terminals. The optional modular design also allows simple adaptability to different connection situations.

Preferably at least one of the auxiliary housings is provided with terminal contacts for connecting signal conductors, which may be designed in any connection technology, for example, with the arrangement of plug connectors or socket connectors on a circuit board being preferable but not obligatory.

The invention also creates a connection device for connecting electric conductors to an electric motor which has a housing with a box-shaped frame for holding the motor connection device and where the connection device has a design for optional connection of conductors to the terminal of an electric motor in at least two different types of circuits, in particular for optional connection of conductors to the terminal of an electric motor by means of a delta connection or by means of a star connection. This creates a connection device with which at these two controls are optionally implementable in the simplest possible manner through a corresponding use of the given connection possibilities.

At least one of the auxiliary housings is especially preferably provided with a bus bar having three terminal contacts for forming a neutral point of a star connection.

SUMMARY OF THE INVENTION

Accordingly, a primary object of the present invention is to provide a connector arrangement for supplying electric power to a three-phase motor for operation in different operating modes—specifically, in a delta operating mode, or in a star operating mode—use being made of modular units that are removably mounted in the chamber of an outer frame that is secured to the motor housing. A main receptacle removably fastened within the first chamber contains a stack of terminal blocks having bus bars that transmit to the motor windings three-phase power that is obtain either from external power supply lines that extend into the first chamber through openings contained in the frame walls, or from an inverter arranged externally of the frame.

According to another object of the invention, additional auxiliary receptacles are removably connected with the external surface of the main receptacle for attaching printed circuit modules for monitoring the operating condition of the motor, or for controlling motor operation, such as braking the motor.

A further object of the invention is to provide in the main receptacle a stack of terminal blocks that carry the respective bus bars for connecting the power supply lines with the ends of the motor windings. The bus bars have first terminals connected with power supply means in the form of either external power supply lines extending through openings contained in the support frame, or from an inverter arranged externally of the frame. The other ends of the bus bars are connected with the ends of the motor windings via fixed contacts that are embedded in and extend through openings contained in the motor housing. Intermediate portions of the bus bars have terminals that are connected by connecting means to produce motor operation in the delta operating mode, and other connections are made to a star bus bar to produce motor operation in the star mode.

BRIEF DESCRIPTION OF THE DRAWINGS

Other objects and advantages of the invention will become apparent from a study of the following specification, when viewed in the light of the accompanying drawing, in which:

FIGS. 4a-4c are perspective views of three types of bus bar connections to stacks of terminal blocks, respectively;

FIG. 7a is a plan view of the assembled connector arrangement of FIG. 5, and FIGS. 7b and 7c illustrate the manner of connection of the motor windings by the connection apparatus of FIG. 7a to produce motor operation in the delta and star modes, respectively.

DETAILED DESCRIPTION OF THE INVENTION

Figure 1:
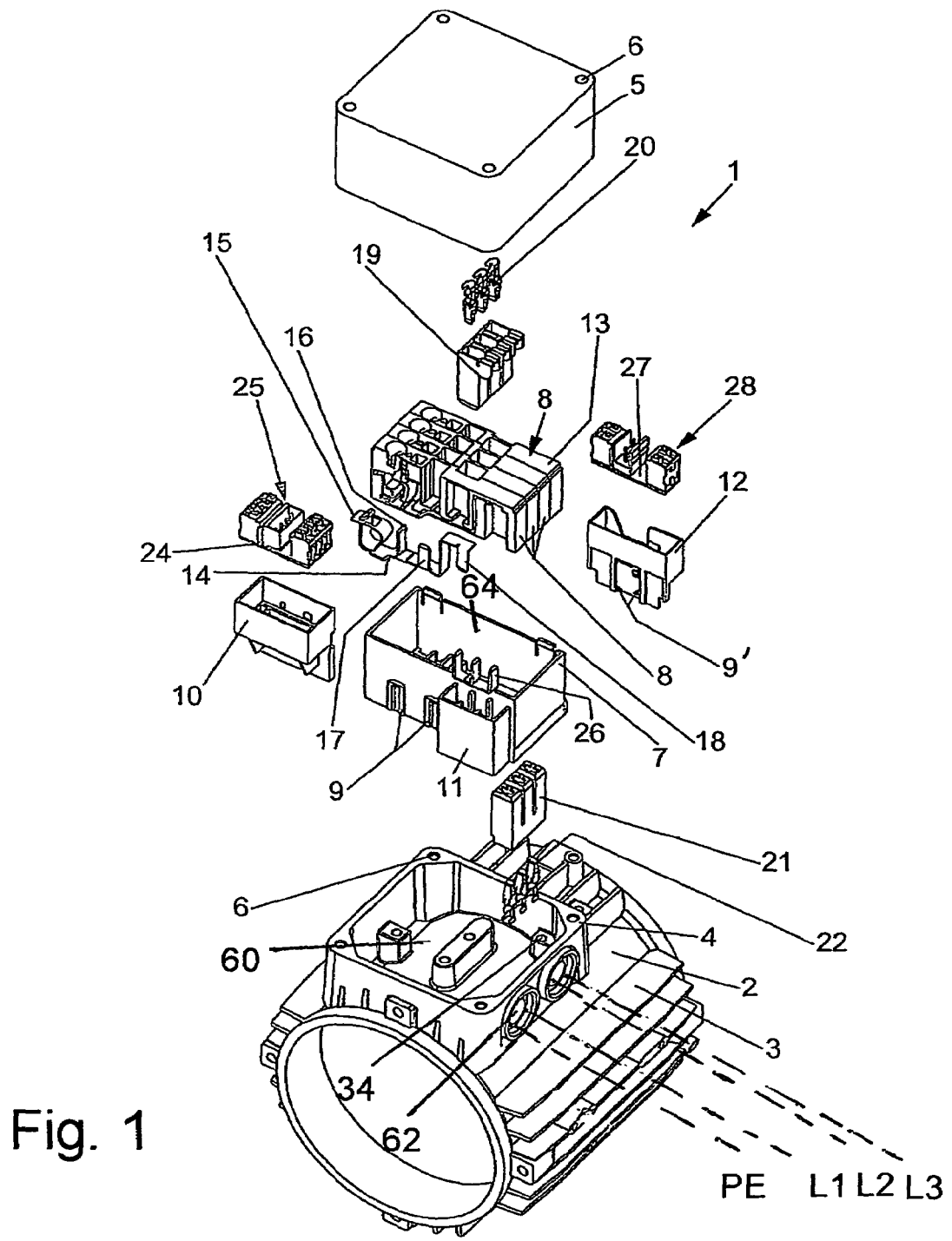
FIG. 1 is an exploded perspective view of a connection arrangement for supplying power to the windings of an electric motor.

Referring first more particularly to FIG. 1, the motor connection arrangement I is operable to supply three-phase electrical power to the three motor windings of a motor having a generally tubular housing 2 provided with cooling ribs 3. Mounted on the external surface of the housing is an open-topped rectangular frame 4 having side walls that define a first chamber 60. The ends of three-phase power supply lines L1, L2, L3 and a neutral line PE extend into chamber 60 via openings 62 contained in the frame side walls. A cover member 5 is removably connected to close the chamber 60 by screw or bolt means that extend though aligned threaded openings 6 contained in the cover and the frame. Removably mounted within the frame chamber 60 is a modular rectangular main receptacle 7 having side walls that define a second chamber 64. Arranged in this second chamber is a stack of terminal blocks 8 having housings 13 formed from an electrically insulating synthetic plastic material within which are mounted first bus bars 14, respectively. Rigidly attached to the outer side wall surface of the main receptacle 7 is a first auxiliary housing 11 that contains a three-legged bus bar 26 that produces operation of the motor in the star mode, as will be described below. Removably connected with the external surfaces of the side walls of the main receptacle by dovetail tongue and groove means 9, 9' are a plurality of modular second auxiliary housing receptacles 10 and 12. Arranged within the auxiliary receptacle 10 is a signal transmitting module 25 including a printed circuit board for transmitting data or control signals to and from the motor. Arranged within the auxiliary receptacle 12 is a signal transmitting module 28 including a printed circuit board 27 for controlling motor operation, such as braking.

Figure 2:
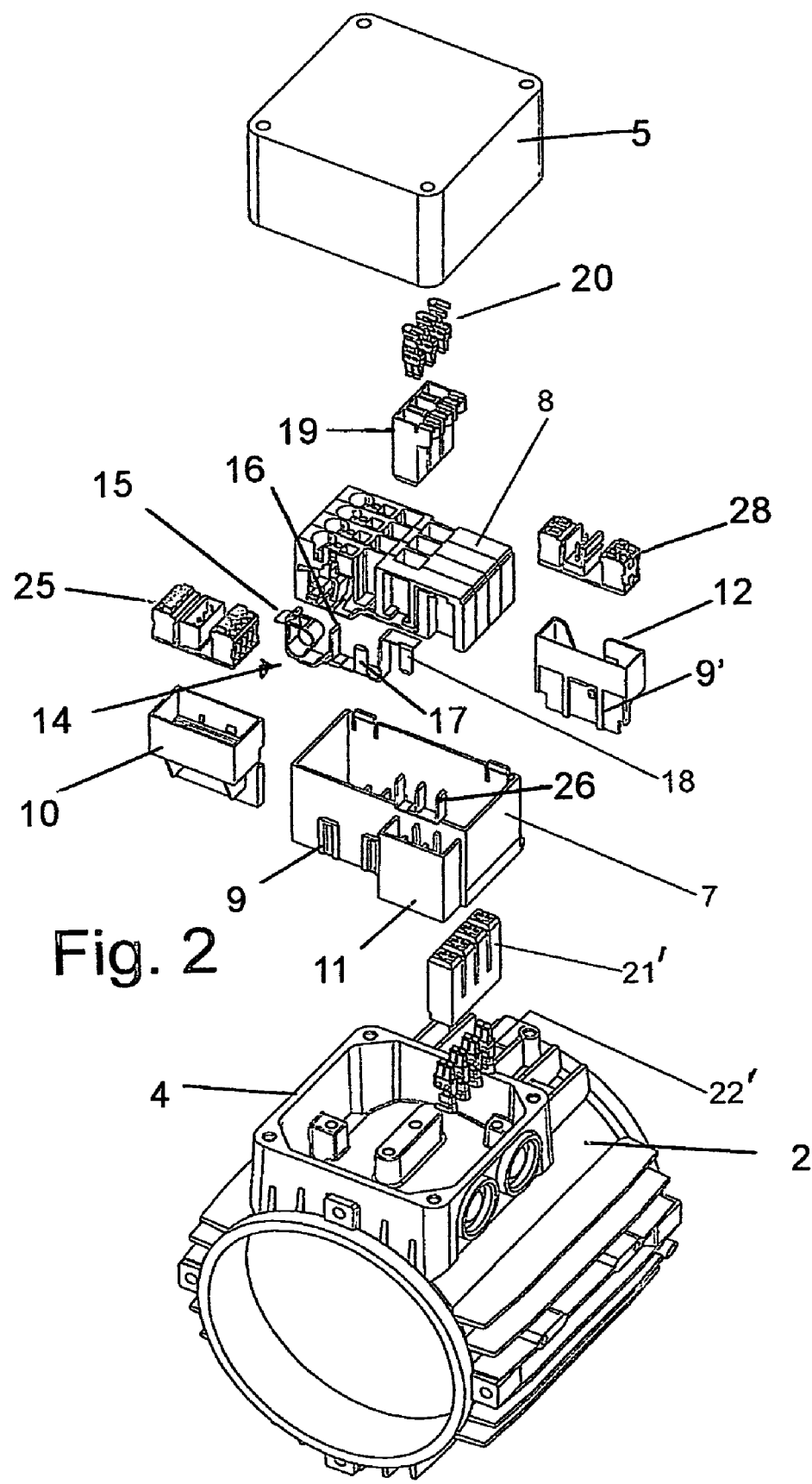
FIG. 2 is an exploded perspective view of a modification of the connection arrangement of FIG. 1.

The bus bars 14 includes at one end a first power terminal 15 in the form of a resilient contact arranged for connection with one end of a corresponding one of the power supply conductors L1, L2, L3. A second power terminal 16 is provided for connecting the bus bar with a power supply line from an inverter 29 (FIG. 6), as will be described in greater detail below. A third terminal 17 is provided for connection with the delta jumper connection means 19 in the form of a socket having female contacts 20. As best shown in FIG. 4a, these first three terminals extend upwardly for connection with the associated electrical component, the first terminal being a resilient spring contact, and the second and third terminals being flat blade male contacts. A fourth terminal 18 extends downwardly from the other end of the bus bar for connection with a corresponding one of the female contacts 22 of a motor winding connector 21 that is mounted in an opening contained in the motor housing 2 for connection with the ends of the motor windings U, V, W (FIG. 7), as will be described below. In the embodiment of FIG. 1, the winding connector socket component 21 has three contacts 21, while in the modification of FIG. 2, the socket component 21' includes four winding contacts 22'.

Figure 3:
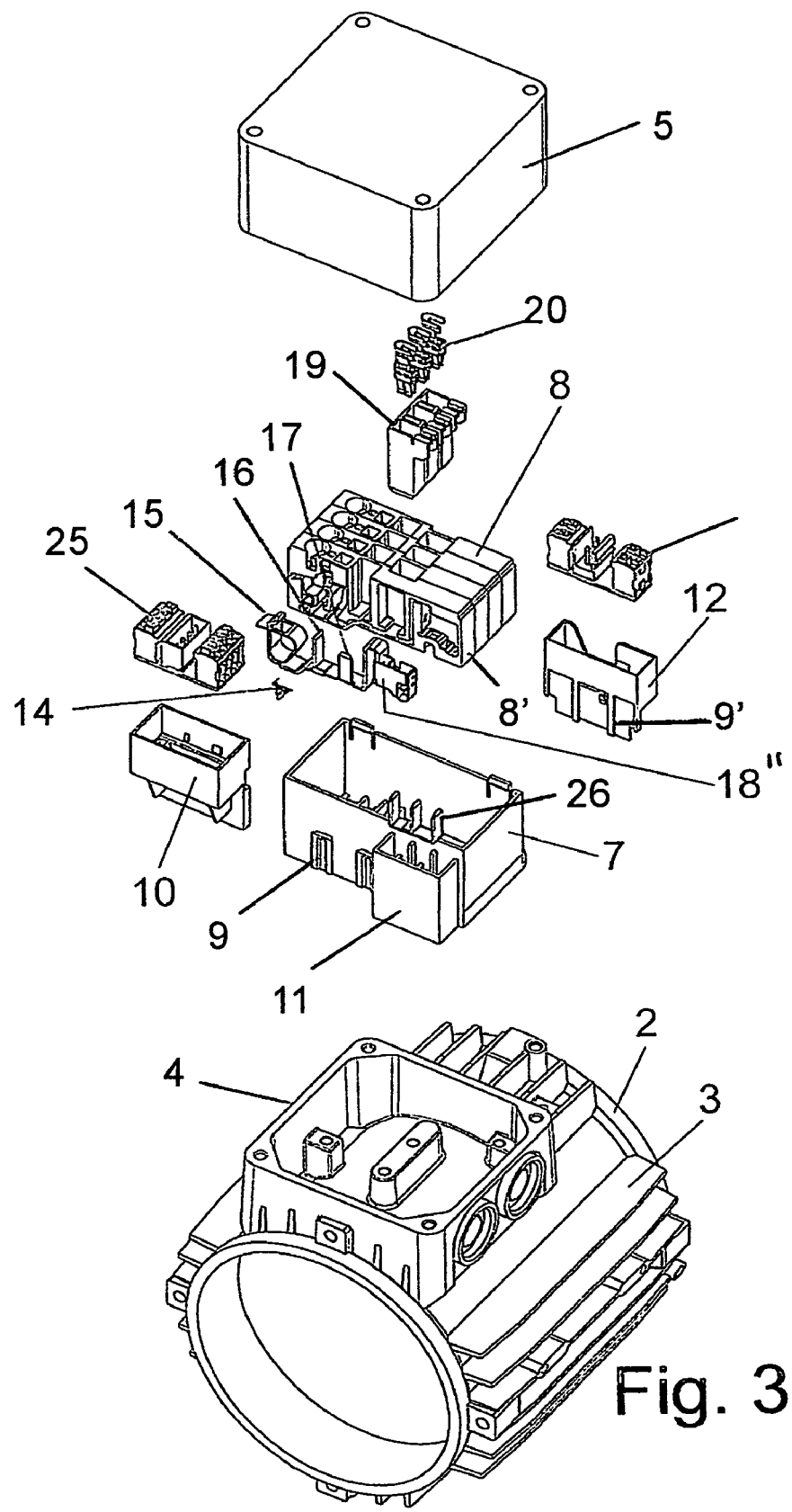
FIG. 3 is an exploded view of a modification of FIG. 1 including the bus bar means of FIG. 4c, and with certain parts removed.

Referring now to FIGS. 3 and 4, it will be seen that the bus bars 14 of the neutral wire terminal block may have different types of fourth terminals. In the terminal block of FIG. 4a, the bus bar 14 has a male plug contact 18 that extends downwardly for connection with the associated contact 22' of the socket 21' of FIG. 2. In the embodiment of FIG. 4b, the terminal 18' is a resilient terminal for connection with a jumper wire, and in the embodiment of FIG. 4c, the terminal 18" could be a resilient terminal or a dummy terminal. In each embodiment, the first, second and third bus bar terminals 15, 16 and 17 extend upwardly for connection with the corresponding electrical component, and the fourth terminal extends downwardly.

Figure 5:
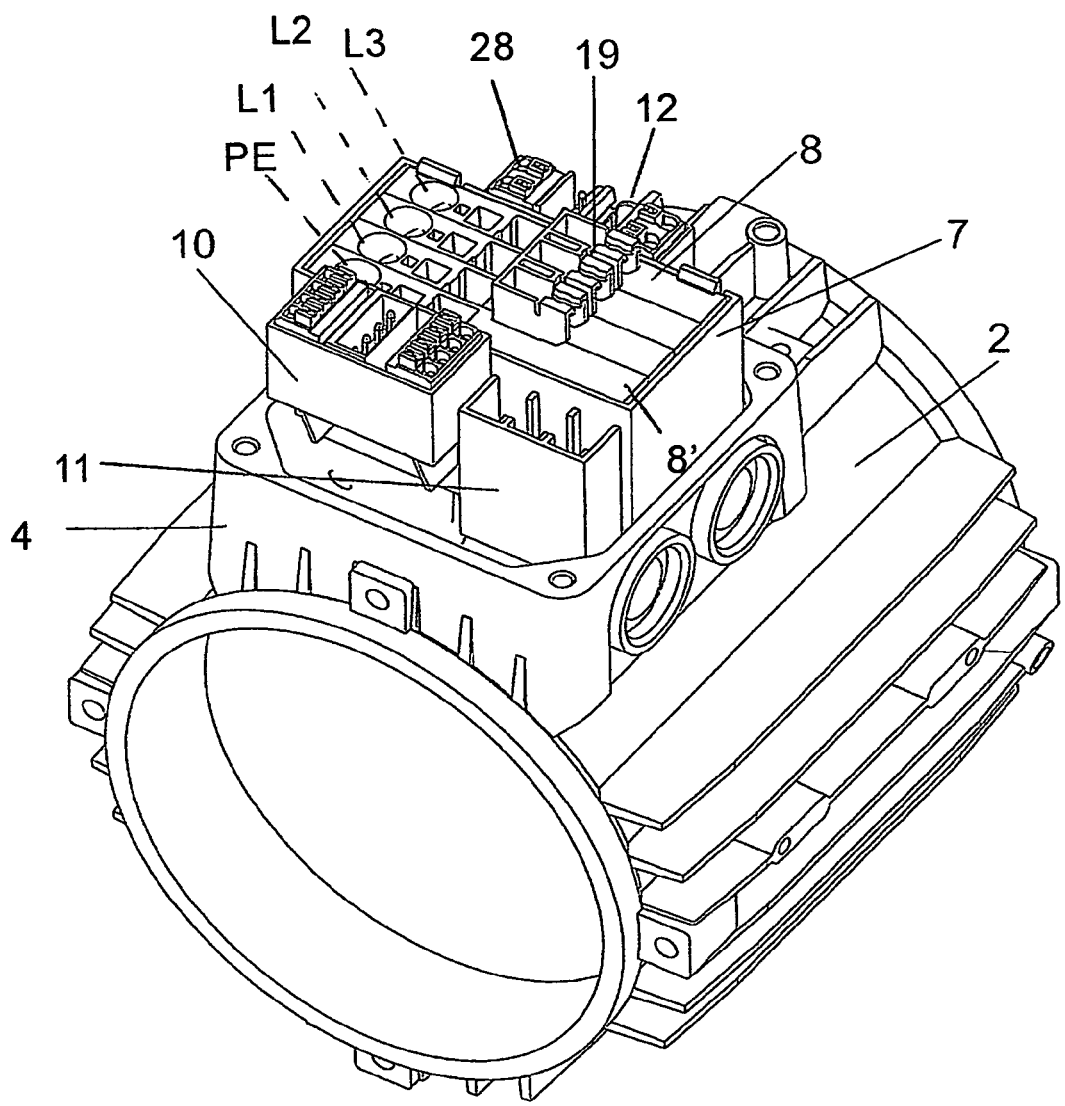
FIG. 5 is a perspective view of the power supply connection arrangement of FIG. 1 in the assembled condition with the cover removed.

As illustrated in FIG. 5, the main receptacle module 7, with the auxiliary receptacle modules 10, 11, and 12 connected therewith, may be inserted as a unit within the chamber 60 defined within the outer frame 4, whereupon the assembly is fastened to the frame by threaded screw or bolt means (not shown) extending through the receptacle opening 33 (FIG. 3) and the aligned threaded frame opening 34 (FIG. 1).

Figure 6:
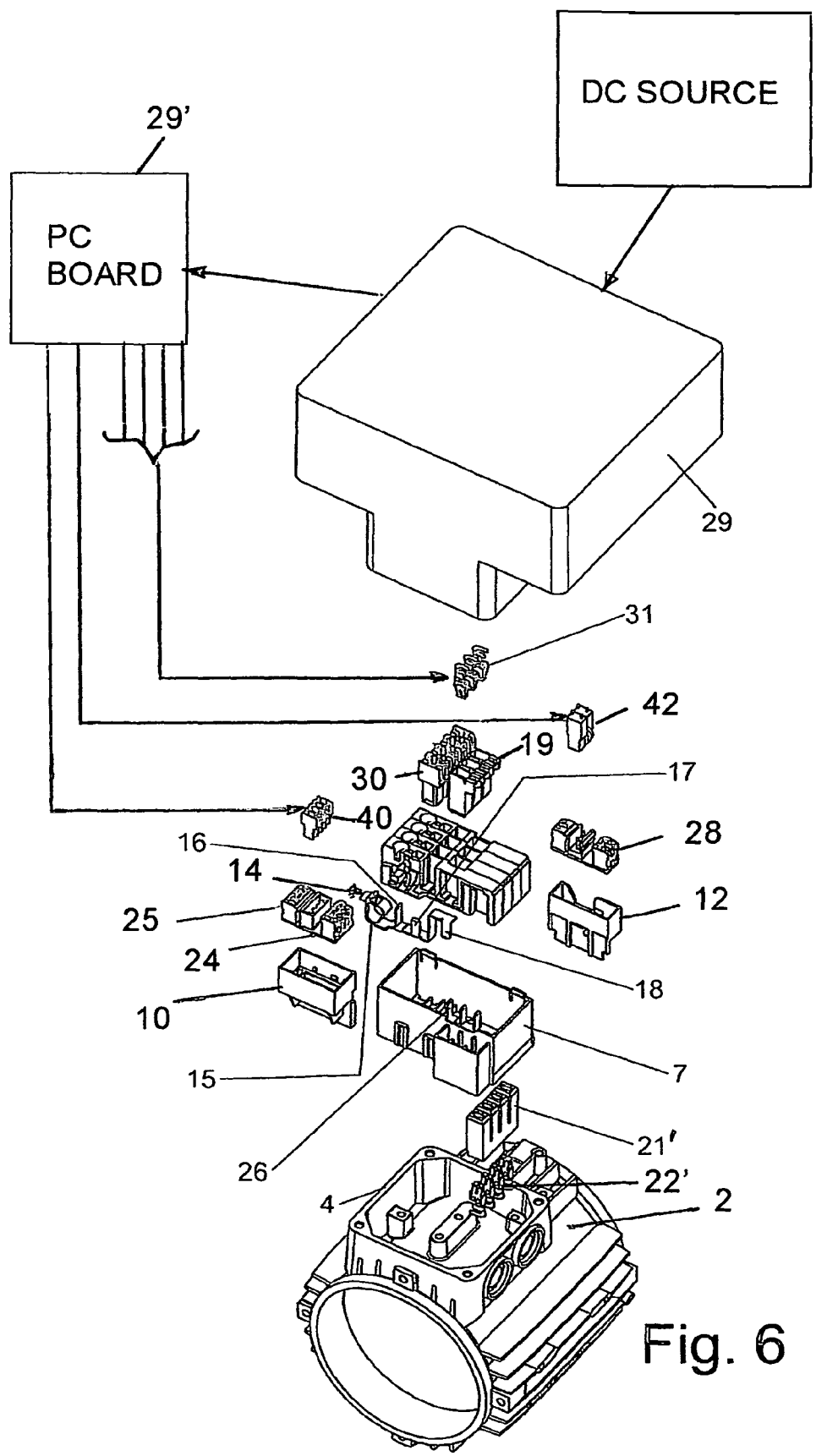
FIG. 6 is an exploded view illustrating the manner of connecting the electric motor winding with an inverter component.

Referring to FIG. 6, in accordance with an important feature of the invention, as an alternative to the three-phase power supply lines L1, L2, L3, the motor may be supplied with three-phase power supplied by an inverter 29 arranged externally of the frame. In this case, connector socket 30 having female terminals 31 supplies the three-phase power from the output terminals of the inverter printed circuit board 29' to the motor windings via the second bus bar terminals 16, the bus bars, 14, the bus bar terminals 18, and the connector 21'. Data and/or control signals are sent to or from the inverter printed circuit board 29' and the motor windings via the connectors 40 and 42 and the signal transmitting means of the modules 25 and 28 of the auxiliary receptacles 10 and 12, respectively.

Referring now to FIGS. 7a and 7b, in order to operate the motor 2 in the delta operating mode, 400 volt power is supplied by the power supply lines L1, L2, L3 to the input bus bar terminals 15 of the terminal blocks 8. The input terminal 15 of the terminal block 8' is preferably disconnected from the neutral line PE at this time, since no neutral connection is used in the delta mode of operation. As shown in FIG. 7b, the supply lines L1, L2, and L3 are connected by the bus bars 14 of the terminal blocks 8 with the winding second ends W2, V2 and U2, respectively. Jumper connections associated with the connector 19 connect the winding first ends U1, V1, and W1 with the junctions J between the winding second ends W2, U2 and V2 and the associated power supply lines, respectively.

In order to achieve operation of the motor in the 230-volt star operating mode shown in FIG. 7c, the three power supply lines remain connected with the input terminals of the terminal blocks 8, and the neutral line PE is connected with the input terminal 15 of the bus bar of the terminal block 17. The connector 19 is disconnected from the terminal blocks, and the bus bar of the fourth terminal block 8' is connected with the star point of the star bus bar 26. The three legs of the star bus bar 26 are connected with the second winding ends U2, V2, W2, and the winding ends U1, V1 and W1 are connected with the power supply lines L1, L2 and L3, respectively.

The modular design produced by the present invention is especially advantageous, in the one or more of the options expansion auxiliary receptacles 10-12 are provided on the basic receptacle frame 7 in the manner of a basic module to take into account various connection situations.

While in accordance with the provisions of the Patent Statutes the preferred forms and embodiments of the invention have been illustrated and described, it will be apparent to those skilled in the art that changes may be made without deviating from the invention described above.

What is claimed is:

1. A connection arrangement for supplying electrical power from a source of alternating-current power to the windings of an electric motor comprising:
   (a) a source of three-phase alternating-current power including three power supply lines (L1, L2, L3) and a neutral line (PE);
   (b) an electric motor including:
      (1) a generally tubular motor housing (2);
      (2) a plurality of motor windings (U, V, W) mounted within said motor housing, each of said motor windings having first (U1, V1, W1) and second (U2, V2, W2) ends; and (3) a hollow generally rectangular outer frame (4) mounted on the outer surface of said housing, said outer frame including side wall means defining a first chamber (60);

(c) a main receptacle (7) having side wall means defining a second chamber (64), said side wall means having an external surface;

(d) a first auxiliary housing (11) connected with said main receptacle external surface, said main receptacle and said first auxiliary receptacle being mounted in said outer frame first chamber;

(e) first winding connecting means (19; 30) arranged in said main receptacle second chamber for connecting said motor windings with said power source to produce a delta mode of motor operation; and (f) second winding connecting means (26) at least partially arranged in said first auxiliary receptacle for connecting said motor windings with said power supply lines and said neutral line to produce a star mode of operation.

2. A connection arrangement as defined in claim 1, wherein said first winding connection means comprises:

(1) a stack of at least three terminal blocks (8) mounted in said second chamber, said terminal blocks having housings (13) formed of electrically insulating synthetic plastic material and including electrically conductive first bus bars (14) having first terminals (15, 16) connected with said power supply lines, respectively, and second terminals (18) adapted for connection with said motor winding ends, respectively.

3. A connection arrangement as defined in claim 1, wherein said bus bars also include third terminals (17); and further including:

(2) delta connecting means (19, 20) adapted for connection between said bus bar third terminals to connect said motor windings in the delta operating mode with the first ends of the windings (U1, V1, W1) being joined in a chain with the second ends (U2, V2, W2) of different windings, respectively, and with the junctions (J) between the winding ends being connected with said power supply lines, respectively.

4. A connection arrangement as defined in claim 2, wherein said terminal block stack includes a fourth terminal block (8') arranged in said main receptacle second chamber, said fourth terminal block including a further one of said first bus bars the first terminal (15, 16) of which is connected with said neutral line; and further wherein said second winding connection means comprises:

(1) a second bus bar (26) arranged in said auxiliary housing, said second bus bar including:

(a) a center portion connected with said neutral line via the bus bar of said fourth terminal block, and with said motor winding second ends (U2, V2, W2), and (b) three leg portions extending from said center portion, said leg portions being connected with said motor winding first ends (U1, V1, W1), respectively.

5. A connection arrangement as defined in claim 4, wherein said first bus bar first terminal (15) comprises a resilient terminal for connection with one of said power supply and neutral lines.

6. A connection arrangement as defined in claim 4, wherein said first bus bar first terminal (16) comprises a flat male plug contact.

7. A connection arrangement as defined in claim 4, wherein said first bus bar third terminal (17) comprises a flat male plug contact.

8. A connection arrangement as defined in claim 4, wherein said first auxiliary receptacle is detachably connected with said main receptacle.

9. A connection arrangement as defined in claim 4, wherein said first auxiliary receptacle is rigidly secured to said main receptacle.

10. A connection arrangement as defined in claim 4, and further including means (33, 34) for fastening said main receptacle in said frame first chamber.

11. A connection arrangement as defined in claim 4, and further including a second auxiliary receptacle (10) removably connected with the external surface of said main receptacle; and further including circuit board means (24) mounted in said second auxiliary receptacle, said circuit board means being connected with said motor winding via said bus bars for transmitting and for monitoring the operating condition of the motor.

12. A connection arrangement as defined in claim 11, and further including a third auxiliary housing (12) removably connected with the external surface of said main receptacle, and printed circuit control signal means (27) mounted in said third auxiliary receptacle for braking the electric motor.

13. A connection arrangement as defined in claim 6, and further including winding connector means (21, 22) mounted in through openings contained in said motor housing for connecting said first bus bar second terminals (18) with said motor winding ends.

14. A connection arrangement as defined in claim 1, wherein said power source comprises three-phase power supply line means (L1, L2, L3) extending into said first chamber via opening means (62) contained in said outer frame side wall means.

15. A connection arrangement as defined in claim 1, wherein said power source includes inverter means (29) arranged externally of said first and second chambers for converting direct-current power to alternating current power supplied by said power supply lines.

* * * * *